Figure 1:
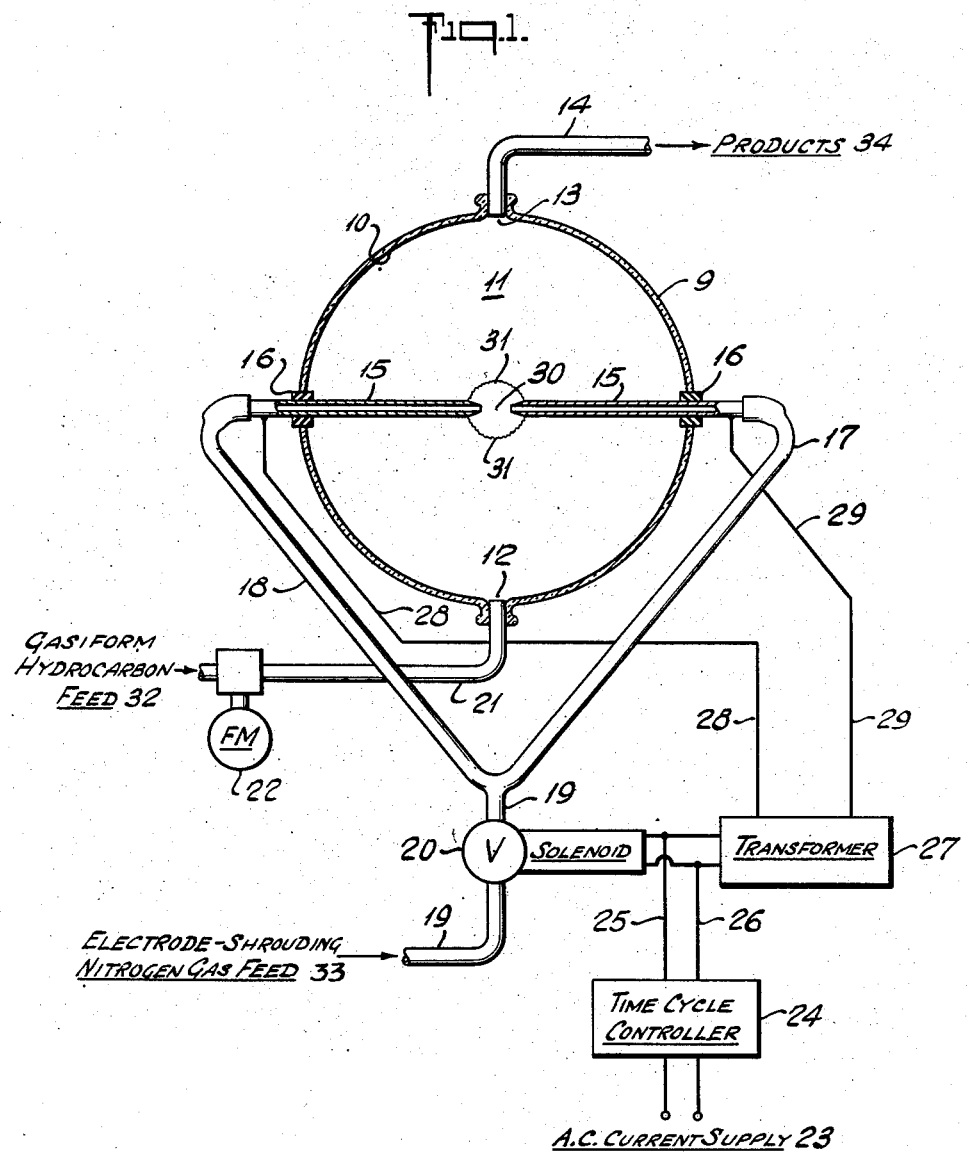

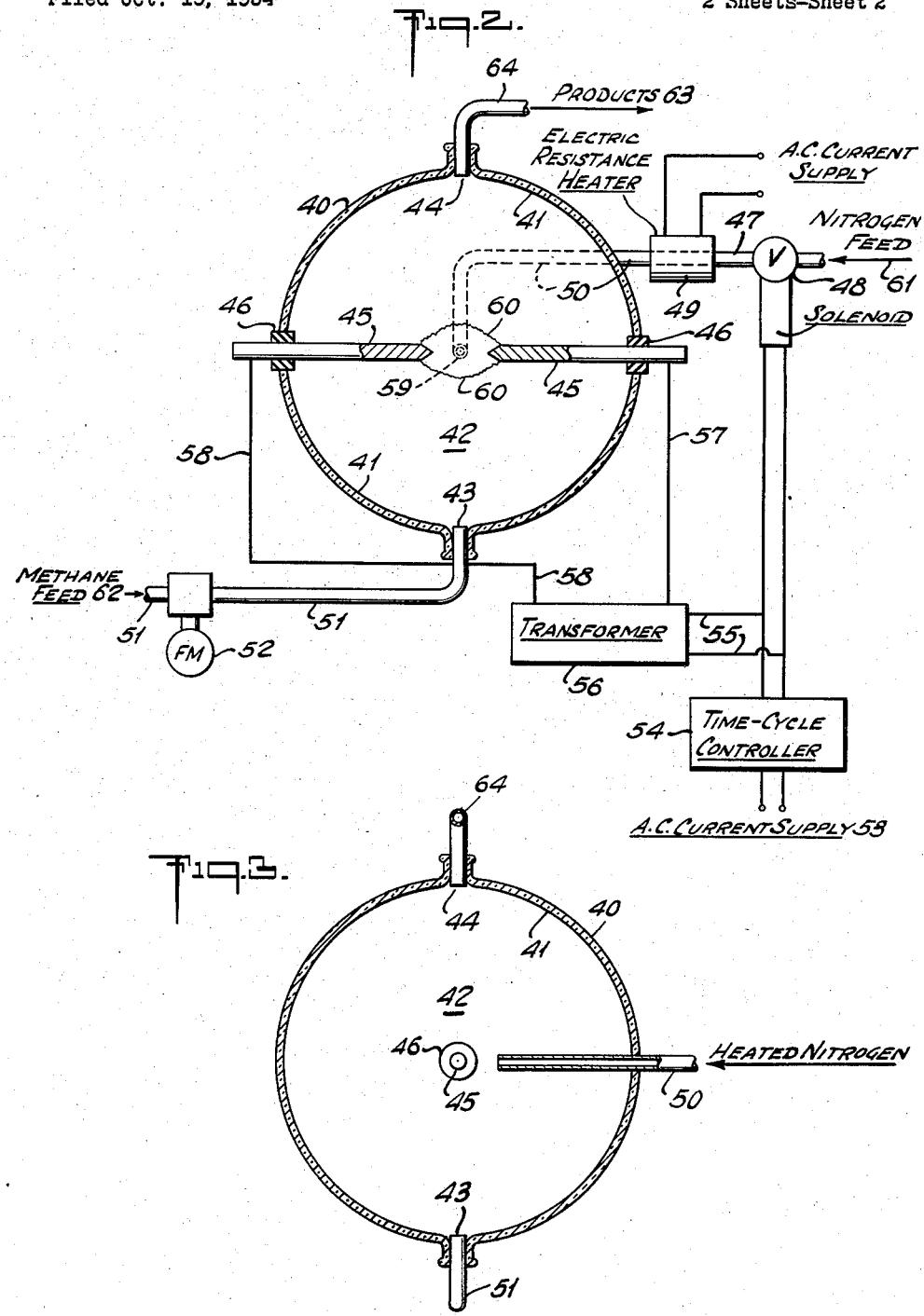

United States Patent Office 2,858,261
Patented Oct. 28, 1958

2,858,261
ACETYLENE GENERATION WITH AN ELECTRIC ARC

Ernest F. Pevere, Beacon, and Howard V. Hess, Glenham, N. Y., assignors to The Texas Company, New York, N. Y., a corporation of Delaware Application October 19, 1954, Serial No. 463,188

5 Claims. (Cl. 204—171)

This invention relates to improved process and apparatus for the simultaneous production of acetylene and hydrogen cyanide and more particularly to such improvements wherein gasiform hydrocarbon is passed into, and an ionizing electrical discharge is made in a reaction zone defined by gas-contacting surface therearound.

Broadly our improvement in such process comprises: maintaining electrodes having electrical discharge ends at a substantial distance from the gas-contacting surface of the reaction zone; intermittently springing an electrical discharge across said electrode ends; passing into said reaction zone electrode-shrouding gas consisting essentially of nitrogen, the introduction of said electrode-shrouding gas into said reaction zone being substantially coincident with the duration of the electrical discharge only and being made in the immediate vicinity of the perimeter of the electrical discharge, thereby investing the region of said electrical discharge with a high concentration of said shrouding gas; passing gasiform hydrocarbon continuously into said reaction zone, the introduction of said hydrocarbon being made without the perimeter of the electrical discharge; and continuously withdrawing products from said reaction zone, said products comprising substantial proportions of both acetylene and hydrogen cyanide. The term "substantial proportions" of both acetylene and hydrogen cyanide should be construed to mean a volume of each of these materials at least equal to 2% of the total volume of the gas containing said materials.

Our improved apparatus is an electric arc generator comprising: a vessel having walls confining to gas; means breaching said walls for product outlet and for gasiform hydrocarbon inlet; at least a pair of electrodes, at least one of which is a hollow electrode, said electrodes having electrical discharge ends maintained at a substantial distance from the walls of said vessel, said electrodes being adapted for the intermittent springing of an electric arc across said discharge ends, said hollow electrode being also inlet means for a flow of nitrogen gas into said vessel, said electrode ends being disposed sufficiently far into said vessel to maintain perimeter of the electric arc sprung across said ends at distance of at least about 3 inches away from any portion of said walls; and means synchronizing flow of nitrogen gas with electric arc duration.

Advantages of our process and apparatus are simplicity, versatility, and highly efficient utilization of electrical energy for production of valuable gaseous products coupled with low carbon formation and minimized dilution of gaseous products. Our product gas is valuable for the production of acrylonitrile.

The drawings depict a pair of our electric arc generators and process flows for the operation thereof.

The generator of Figure 1 is arranged as follows: Vessel 9 is a spherical glass flask of 3-liter capacity and is depicted in cross sectional elevation taken through the longitudinal axis of tubular electrodes 15. Interior wall surface 10 of vessel 9 constitutes the gas-contacting surface defining the space within the flask, said space constituting reaction zone 11. Opening 12 at the bottom of vessel 9 is the hydrocarbon inlet. Opening 13 at the top of vessel 9 is the product outlet. Electrodes 15 are copper, tapered at the ends, said ends forming a gap of about ½ inch in the center of reaction zone 11. The electrodes are sealed into the flask walls with rubber 16. Tube 17 is connected to the outside extension of the right hand electrode, and tube 18 is connected to the outside extension of the left hand electrode. Tubes 17 and 18 are connected in parallel with electrode-shrouding nitrogen gas supply pipe 19 equipped with solenoid valve 20. Hydrocarbon feed tube 21 is connected to opening 12 in vessel 9 and is equipped with flow meter 22. Alternating current supply 23 enters time cycle controller 24, time cycle controller 24 being of the rotating disk type for making and breaking electrical connection at regular intervals. Electrical leads 25 and 26 are connected in parallel to solenoid valve 20 and to the low voltage side of transformer 27, to open valve 20 and energize transformer 27 simultaneously. High voltage transformer leads 28 and 29 are connected to the left hand and right hand electrodes respectively.

In the operation of this generator, time cycle controller 24 periodically energizes transformer 27 causing an electrical discharge between the electrode ends extending into vessel 9, the region of the electrical discharge being shown as item 30 and the perimeter of the electrical discharge (visible to the eye) being shown symbolically by jagged lines 31. Simultaneously with the springing of the electrical discharge across the electrode ends solenoid valve 20 opens and permits a flow of nitrogen shrouding gas feed 33 to pass from an elevated pressure source through line 19, whence the shrouding gas passes in approximately equal proportions through tubes 17 and 18 and through electrodes 15, then enters electrical discharge region 30. Throughout the operation a steady flow of gasiform hydrocarbon feed 32 passes through tube 21 and into reaction zone 11 by means of opening 12. When time cycle controller 24 breaks the current supply, the electrode-shrouding nitrogen gas feed 33 is turned off by solenoid valve 20 and the electrical discharge is switched off. Products 34 are withdrawn in a steady stream through tube 14 from opening 13.

The generator of Figure 2 is arranged as follows: Vessel 40 is a spherical glass flask of 5-liter capacity depicted in cross sectional elevation taken through the longitudinal axis of solid copper electrodes 45. Interior wall surface 41 of vessel 40 constitutes the gas-contacting surface defining the space within the flask, said space constituting reaction zone 42. Opening 43 at the bottom of vessel 40 is the hydrocarbon inlet and opening 44 at the top of vessel 40 is the product outlet. Electrodes 45 are solid and pointed at the ends which extend into reaction zone 42, said pointed ends forming a gap of about ½ inch in the center of the reaction zone. The electrodes are sealed into vessel 40 by means of rubber 46. Nitrogen feed supply pipe 47, equipped with solenoid valve 48, enters electric resistance heater 49. Heated gas discharge line 50 is made of heavy-walled glass and extends from resistance heater 49, through the wall of vessel 40, and enters reaction zone 42 approximately transverse to and in the same plane as electrodes 45, line 50 however terminating with an open end about 1¼ inches from the center of the reaction zone. Methane line 51, equipped with flow meter 52, is connected with opening 43 in the bottom of vessel 40. Alternating current supply 53 enters time cycle controller 54, the time cycle controller being the same type as item 24 described hereinbefore with reference to Figure 1.

Solenoid valve 48 and transformer 56 are energized periodically (in the same manner as their counterparts described hereinbefore with reference to Figure 1) making an electrical discharge in electrical discharge region 59 of reaction zone 42, the perimeter of the electrical discharge (visible to the eye) being shown symbolically by jagged lines 60. Nitrogen feed 61 enters tube 47, is heated by heater 49, and passed into the immediate vicinity of the electrical discharge, thereby investing region 59 with the heated nitrogen. Operation of the time cycle controller intermittently springs the electrical discharge across the electrodes and simultaneously permits flow of nitrogen from an elevated pressure source in the same way as has been described hereinbefore with reference to Figure 1. Methane feed 62 from an elevated pressure source flows steadily through line 51 and into inlet 43. Products 63 are withdrawn in a steady stream through tube 64 from opening 44.

Figure 3 is a vertical cross sectional elevation of the flask shown in Fig. 2, but is taken through the longitudinal axis of heated nitrogen inlet 50 to show more clearly the disposition of the nitrogen inlet with respect to the electrodes and the center of the vessel. The items enumerated correspond to those described above for Figure 2.

The hydrocarbon feed to our apparatus and for use in our process is gasiform, i. e. a gas or vapor under our processing conditions. Ordinarily this feed is a normally gaseous hydrocarbon, but many normally liquid hydrocarbons can be vaporized for use in our process. The hydrocarbon can have aliphatic, olefinic, napthenic or aromatic structure, or combinations of these structures, the cyclic structures, however, being somewhat less readily convertible into the desired products by use of the electrical discharge than are the chain structures. Hydrocarbon gases and hydrocarbons having boiling points at atmospheric pressure below about 400° F. are, as a practical matter, the stocks most suitable for use with an invention, particularly saturated aliphatic hydrocarbons, and adavntageously a saturated aliphatic hydrocarbon having from one to four carbon atoms.

Methane is the preferred hydrocarbon charging stock for efficiency and economy in the practice of our invention. The process according to the present invention is, of course, not restricted to the use of highly concentrated hydrocarbon gases. The hydrocarbon feed stock can be diluted with substantial amounts of an inert gas such as nitrogen; however we have found, surprisingly, that presence of substantial amounts of hydrogen gas in the hydrocarbon or shrouding gas feed to our process exerts a pronouncedly deleterious effect on yields of desired products and increases rather than decreases carbon formation. Natural gas, coal gases, refinery residue gas, gases arising from the low temperature carbonization of coals or lignites after separation of hydrogen, or other gases comprising suitable gasiform hydrocarbon may be employed as starting material, provided that their hydrogen contents are not substantial, i. e. below about 15 volume percent, and preferably nil.

In our process and when using our apparatus the electrode-shrouding nitrogen gas is introduced into the reaction zone from location in the immediate vicinity of the perimeter of the electrical discharge, and the gasiform hydrocarbon is introduced into the reaction zone from location more remote to said perimeter. This mode of introduction invests the atmosphere in the region of the electrical discharge with the highest concentration of nitrogen. This region is thereby made lower in hydrocarbon than is the enveloping atmosphere during duration of the electrical discharge. Ratio of hydrogen cyanide: acetylene in the product gases can be raised by heating the nitrogen shrouding gas before passing it into the reaction zone through the electrodes. However, to change this ratio appreciably from that obtained by using nitrogen at room temperature we have found that it is necessary to heat the nitrogen to at least about 1000° F. before passing it into the reaction zone.

The electrode-shrouding nitrogen gas need not be pure for use in our process. Substantial dilution with inert gases, e. g. argon, neon, helium, krypton and xenon, is permissible. The process appears to be, to a large measure, insensitive to introduction of small proportions of water vapor and/or oxygen also, but it is preferred to exclude the latter materials to avoid side reactions, loss of yield, and possible explosion hazards.

At least a substantial portion of the nitrogen shrouding gas necessary for operation can be recovered from product gases and recycled advantageously to the reaction zone. For efficiency and economy in the practice of our process and in the design of our apparatus we prefer to use hollow electrodes for introduction of the electrode-shrouding nitrogen gas.

By making and breaking the electrical discharge at intervals (i. e. springing the discharge across the electrodes intermittently) we have found that carbon formation is greatly reduced, particularly when the electrical discharge is, at regular intervals, on for as long as 1 second and off for as long as 1.5 seconds, preferably on for about 0.1–1 second and off for about 0.2–1.5 seconds. A particular feature of our process is the introduction of the electrode-shrouding nitrogen gas into the reaction zone substantially coincident with the duration of the electrical discharge only. This not only assists in decreasing carbon formation, but it also reduces nitrogen dilution of the product stream significantly. Our apparatus as operated includes means synchronizing the electric arc duration and the nitrogen shrouding gas flow for the arc.

We have found the use of alternating current particularly effective in the practice of our process and therefore prefer it. Common 60 cycle current can be used advantageously without rectification or changing of the cycle. We have been able to obtain attractive output of both acetylene and hydrogen cyanide simultaneously, using voltage of from about 1000 to about 4000 volts across the electrical discharge gap. Particularly surprising in the experimental operation of our invention was that, after an extended period of operation wherein gas feeds were introduced at room temperature, the outside surface of a 5 liter thin-walled spherical reactor was only slightly warm. This was a good indication that a desirable fraction of the electrical energy was being converted into useful work.

While pressures in the reaction zone can be maintained above or below atmospheric, economy is enhanced by operation of our process at about atmospheric pressure and it is therefore, preferred. Pressures somewhat above atmospheric can also be used with advantage on occasion as the reduction in the size of gas handling equipment will compensate to some extent for diminished yields and the heavier equipment necessary. Use of pressure substantially below atmospheric (about 4 inches Hg absolute, or lower) should be avoided since equipment must be large for the weight of gas handled and leaks from atmosphere are apt to occur and disrupt operation, even creating dangerously explosive mixtures. Since the type of electrical discharge obtained at the operational pressures we use appears to be an arc discharge rather than a glow or other type of discharge, we speak of our apparatus as an electric arc generator.

Walls of the reactor are formed from non-conductors such as glass and ceramics preferably. Disposition of proper electrical insulating materials at location of high potential differences will, however, permit use of metallic structural materials such as iron and steel for the reactor walls. Electrodes can be made of copper, aluminum, silver and iron, and they can be movable, rotating or stationary. A pair of stationary tubular electrodes tapered at the ends are preferred for their simplicity in small scale operation. In large scale operation it is, of course, possible to use polyphase current, a multiplicity of electrodes or electrode pairs, and a plurality of arcs therebetween.

The flow of electrode-shrouding gas can be synchronized with the electrical discharge in a number of ways e. g. using manual or automatic valves on the shrouding-gas flow turned on and off coincidently with the electrical discharge. Such valves can be, for example solenoid-operated, the solenoids being connected to turn on and off with the electrical discharge. It is possible to operate such solenoid valves by means of an induction coil energized by the electric current in the arc circuit, the coil in turn actuating the valve solenoids or a switch controlling the valve solenoids. Mechanical or electrical time cycle controllers can also be used to control flow of nitrogen shrouding gas and the making and the breaking of the arc.

We have found that, if the gas-contacting surface of the reaction zone (the reaction vessel inner wall in the case of our improved apparatus) is substantially closer than about 3 inches from the perimeter of the electrical discharge sprung across the electrodes, conversion of the hydrocarbon into the desired products begins to be reduced and the power input per unit weight of acetylene and HCN is increased; therefore we advise maintaining perimeter of the electrical discharge at least this distance from any portion of the gas-contacting surface which defines the reaction zone. In preferred embodiment of our invention we maintain perimeter of the electrical discharge at distance of about 3½ to about 4 inches from said gas-contacting surface to obtain high conversion of hydrocarbon into desired products without bypassing too much hydrocarbon around the ionized atmosphere of the discharge.

Shape of the reaction vessel can be accurately or approximately spherical, spheroidal, prismatic, cylindrical, similar to two cones base-to-base (with the electrode gap in the center of the vessel where each cone has altitude: base diameter ratio of at least about 1.15 to permit formation of the electrical discharge with its perimeter no closer to the walls of the cones than it is to the base ring where the two cones meet), or an appropriate assembly of these shapes or portions thereof adapted to house the electric arc away from the reactor wall. For simplicity of construction the preferred form of our reaction vessel (as shown in the drawing) is spherical with electrode ends disposed at about the geometric center of the vessel. The hydrocarbon inlet and the product outlet are diametrically opposite each other and are simply open tubes breaching the wall of the sphere. In some instances it is desirable to use a porous plate or other gas-diffusing and explosion arresting device as the hydrocarbon inlet means. The hydrocarbon inlet means can be also a plurality of tubes extending a short distance into the reaction zone and directed to create impinging hydrocarbon flow, or it can be a rotary gas distributor adopted to blend and disperse the hydrocarbon.

The electrical discharge in operation of our process can be seen through transparent reaction vessel walls or through a window in an otherwise opaque wall as a discreet luminous region in the hydrocarbon envelope of the reaction zone. The distance between the periphery of the electrical discharge (i. e. the outer boundary of the luminous region apparent to the eye) and the walls of the reaction zone can be adjusted by projecting the electrodes sufficiently far from the walls of the reaction vessel, also by varying the voltage across the electrode ends, by changing the shape of the electrode ends at the gap, or by adjusting distance between these ends.

Ratio of the average hourly flow rate of hydrocarbon feed: the average hourly flow rate of electrode-shrouding gas can be varied a good deal. Generally, the higher the ratio shrouding nitrogen gas flow to hydrocarbon flow, the less is the formation of carbon. For economy and efficiency in the practice of our process we prefer to adjust the average hourly flow rate of hydrocarbon feed relative to the average hourly flow rate of shrouding gas such that the ratio of gram-atoms of carbon per hour in the hydrocarbon feed:gram moles per hour of nitrogen shrouding gas is about 3:1, e. g. average flow of methane in mols./hr.:average flow of nitrogen through the electrodes in mols./hr. is about 3:1. Residence time of 5–15 minutes in the reactor, i. e. the quotient of reactor volume divided by the sum of the average volumetric flow rates of both the input hydrocarbon and nitrogen (measured at 60° F. and one atmosphere), gives the best results in the practice of our process and is, therefore, preferred.

The following examples show several ways in which our invention has been utilized, but these examples are not to be construed as limiting the invention. All gas volumes are referred to standard conditions of temperature and total pressure, i. e. 60° F. and one atmosphere. Gas analyses are given in volume percent.

*Example 1.*—The apparatus shown in Figure 1 and described hereinbefore was used. The electric arc was on for 0.1 second and off for 0.2 second throughout the run. Nitrogen flow (nitrogen 99.8% pure) was passed through the electrodes coincidently with the making of the arc, was continued for duration of the arc, and was shut off when the arc was off. The electric current supply to the arc was 60 cycle alternating current. Voltage across the arc gap was from about 1000 to about 3000 during the discharge, the average voltage being about 2000. Perimeter of the arc, a yellow light visible through the glass vessel, was between 3 and 3½ inches away from any part of the interior wall of the vessel at all times during the run.

The gasiform hydrocarbon feed analyzing 99.45 methane, 0.06 ethylene, 0.06 ethane, and 0.43 nitrogen was charged at average rate of 0.06 cubic foot per hour and the nitrogen shrouding gas at average rate of 0.2 cubic foot per hour, both of said gases being delivered to the reaction vessel from sources which were at room temperature. Average withdrawal rate of product gases (filtered of carbon) was 0.8 cubic feet per hour. Said product gases were of the following analysis:

| Constituent | Percent | Percent (Nitrogen-free basis) |
|---|---|---|
| nitrogen | 32.0 | |
| hydrogen | 42.7 | 62.8 |
| methane | 13.6 | 20.0 |
| ethylene | 0.4 | 0.6 |
| ethane | 0.1 | 0.1 |
| hydrogen cyanide | 3.9 | 5.7 |
| acetylene | 7.4 | 10.8 |

After 2 hours of operation the outside of the glass 3-liter reaction vessel (the walls of which were 1.5 mm. thick and uninsulated) was only slightly warm to the touch. Electrical energy expended amounted to 0.33 kilowatt-hours per cubic foot of acetylene and hydrogen cyanide in the product gas.

*Example 2.*—The apparatus shown in Figures 2 and 3 and described hereinbefore was used. The electric arc was on for 1 second and off for 1.5 seconds throughout the run. The electric current supply to the arc was 60 cycle alternating current. Voltage across the arc gap was about 2000 volts during the discharge. Perimeter of the arc, a yellow light visible through the glass vessel, was about 4 inches away from any part of the interior wall of the reaction vessel at all times during the run. Nitrogen (99.8% pure) was heated by means of the electric resistance heater to temperature of 1000° F. before passing it into the reaction vessel. Nitrogen flow was on coincidently with the making of the arc, was continued for duration of the arc, and was shut off when the arc was off.

Methane of the same analysis as that used in Example 1 was charged at average rate of 0.06 cubic foot per hour and the nitrogen at average rate of 0.06 cubic foot per hour, the methane being delivered to the reaction vessel from source which was at room temperature. Average withdrawal rate of the product gases (filtered of carbon) was 0.18 cubic foot per hour. Said product gases were of the following analysis:

| Constituent | Percent | Percent (Nitrogen-free basis) |
|---|---|---|
| nitrogen | 52.1 | |
| hydrogen | 33.8 | 70.3 |
| methane | 2.2 | 4.6 |
| ethylene | 0.5 | 1.0 |
| ethane | | |
| hydrogen cyanide | 9.2 | 19.5 |
| acetylene | 2.2 | 4.6 |

Electrical energy expended amounted to 0.87 kilowatt-hour per cubic foot of acetylene and hydrogen cyanide in the product gas.

*Example 3.*—The apparatus used was essentially the same in arrangement as that shown in Figure 1 and described hereinabove, except that the reaction vessel was a one-liter spherical glass flask rather than a 3-liter spherical glass flask. The electric arc was on for 1 second and off for 1.5 seconds throughout the run. Nitrogen flow (nitrogen 99.8% pure) was passed through the electrodes coincidently with the making of the arc, was continued for duration of the arc, and was shut off when the arc was off. The electric current supply to the arc was 60 cycle alternating current. Voltage across the arc gap was about 2600 to about 3000 during the discharge, the average voltage being about 2800. The arc gap between the points of the electrodes was 0.5 inch. Perimeter of the arc, a yellow light visible through the walls of the glass vessel, was between 2 and 2.5 inches away from any part of the interior walls of the reaction vessel at all times during the run.

Methane of the same analysis as that used in Example 1 was charged at average rate of 0.18 cubic foot per hour and the nitrogen at average rate of 0.06 cubic foot per hour, both of said gases being delivered to the reaction vessel at about room temperature. Withdrawal rate of the product gases (filtered of carbon) was 0.29 cubic foot per hour. Said product gases were of the following analysis:

| Constituent | Percent | Percent (Nitrogen-free basis) |
|---|---|---|
| nitrogen | 51.7 | |
| hydrogen | 29.4 | 61.3 |
| methane | 9.2 | 18.7 |
| ethylene | 0.3 | 0.6 |
| ethane | 0.1 | 0.2 |
| hydrogen cyanide | 5.2 | 10.5 |
| acetylene | 4.2 | 8.7 |

After 2 hours of operation the outside of the glass reactor (1.5 mm. thick and uninsulated) was quite warm (225° F. inside the reactor). Electrical energy expended amounted to 0.615 kilowatt-hour per cubic foot of acetylene and hydrogen cyanide in the product gases.

We claim:

1. In a process for the simultaneous production of acetylene and hydrogen cyanide wherein a gasiform hydrocarbon is reacted with nitrogen in an electrical discharge sprung between at least two points within a reaction zone, the improvement which comprises continuously introducing said gasiform hydrocarbon into said reaction zone remote from said electrical discharge, intermittently springing said electrical discharge at regular intervals having a duration of 0.1 to 1 second and off for 0.2 to 1.5 seconds, introducing said nitrogen into the space within said points in the immediate vicinity of said electrical discharge and substantially coincident with the duration of said electrical discharge only, and continuously withdrawing gasiform product comprising substantial proportions of both acetylene and hydrogen cyanide from said reaction zone.

2. The process of claim 1 wherein said electrical discharge is an alternating current discharge the duration of which is about 1 second, said electrical discharge is off about 1.5 seconds, and said gasiform hydrocarbon is methane.

3. A unitary apparatus comprising in combination a vessel having walls confining to gas, inlet and outlet ports disposed in said walls, at least a pair of electrodes disposed within said vessel adapted for the springing of at least one electrical discharge therebetween, a conduit adapted to transmit an electrode shrouding gas into the space within said electrodes and in the immediate vicinity of any electrical discharge sprung therebetween, means adapted to intermittently spring at least one electrical discharge between said electrodes and means adapted to synchronize the flow of electrode shrouding gas to coincide with the springing of said intermittent electrical discharge.

4. The apparatus of claim 3 wherein the vessel is substantially spherical, the inlet and outlet ports are disposed about diametrically opposite each other, and the ends of said electrodes are disposed at about the geometric center of the vessel.

5. In a process for the simultaneous production of acetylene and hydrogen cyanide wherein a gasiform hydrocarbon is reacted with nitrogen in an electrical discharge sprung between at least two points within a reaction zone, the improvement which comprises continuously introducing said gasiform hydrocarbon into said reaction zone remote from said electrical discharge, intermittently springing said electrical discharge, introducing said nitrogen at a temperature of at least 1000° F. into the space within said points in the immediate vicinity of said electrical discharge and substantially coincident with the duration of said electrical discharge only, and continuously withdrawing gasiform product comprising substantial proportions of both acetylene and hydrogen cyanide from said reaction zone.

References Cited in the file of this patent

UNITED STATES PATENTS

| | | |
|---|---|---|
| 777,987 | Werner | Dec. 20, 1904 |
| 1,046,043 | Weintraub | Dec. 3, 1912 |
| 1,051,810 | Hoofnagle | Jan. 28, 1913 |
| 1,339,225 | Rose | May 4, 1920 |
| 1,731,331 | Bagley | Oct. 15, 1929 |
| 2,080,931 | Rose | May 18, 1937 |
| 2,468,175 | Cotton | Apr. 26, 1949 |

FOREIGN PATENTS

| | | |
|---|---|---|
| 296,355 | Great Britain | May 2, 1929 |
| 317,558 | Great Britain | Aug. 22, 1929 |